Nov. 4, 1969   YOSHIMASA TSUNODA ET AL   3,475,801
CUTTING APPARATUS

Filed June 24, 1968   2 Sheets-Sheet 1

INVENTORS
YOSHIMASA TSUNODA
HIDEO IWATA
TSUTOMU OKADA
KOTARO ASO
BY Sughrue, Rothwell, Mion, Zinn & Macpeak
ATTORNEYS 3,475,801
CUTTING APPARATUS
Yoshimasa Tsunoda, Hideo Iwata, Tsutomu Okada, and Kotaro Aso, Kanagawa, Japan, assignors to Fuji Photo Film Co., Ltd., Tokyo, Japan
Filed June 24, 1968, Ser. No. 739,549
Claims priority, application Japan, June 23, 1967, 42/40,244
Int. Cl. B28b 11/14
U.S. Cl. 25—105                                      6 Claims

ABSTRACT OF THE DISCLOSURE

A cutting or slicing apparatus having a rotatable shaft movable up and down with a material filled tank or container, an arm fixed to the shaft having at least two edges, one of which faces upward and the other facing in the direction of rotation, and a knife with a sharp edge facing in the direction of rotation. Gel like material within the tank is cut into the desired portions by the downward motion of the shaft into the material during rotation and the upward movement of the shaft after rotation is stopped and the shaft has reached the bottom of the tank.

---

The present invention relates to a cutting apparatus, in particular to an apparatus for cutting or slicing gel material containing gelatin into fragments in a tank.

In some conventional processes for preparing photosensitive material, a step of cutting or slicing gel material containing gelatin such as silver halide emulsion, matting material is included.

In such a case, usually the gel material which gelled in a tank is taken out of the tank as it is by cutting the material from the wall with a knife. The material is then cut into fragments with a knife. But this method requires much labor and skill for taking out the lump of gel from the tank. In addition, this process takes a long time and a large area for cutting the gel. Moreover, it is hard to cut the gel into uniform size of fragments and a great loss of material results when the gel is broken into undesirably fine fragments.

An object of the present invention is to provide an apparatus for cutting the gel materials containing gelatin into a desired uniform size in a tank.

The invention will be better understood from the following description taken in conjunction with the accompanying drawings in which.

Figure 1:
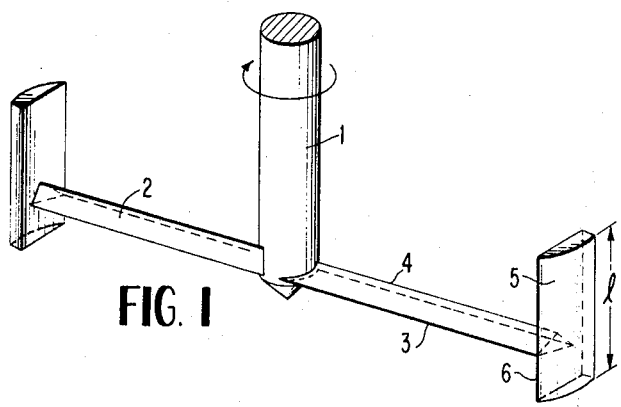
FIG. 1 is a perspective view illustrating a cutting apparatus in accordance with the present invention.

Referring now to the drawings, as shown in FIG. 1 illustrating an embodiment of the cutting apparatus in accordance with the present invention an arm 2 fixed to a rotatable and vertically reciprocal shaft 1 has an edge 3 facing in the rotating direction and an edge 4 facing upward. A knife 5, fixed to the outer extremities of arm 2, has a sharp edge 6 facing in the rotating direction of the shaft.

Figure 2:
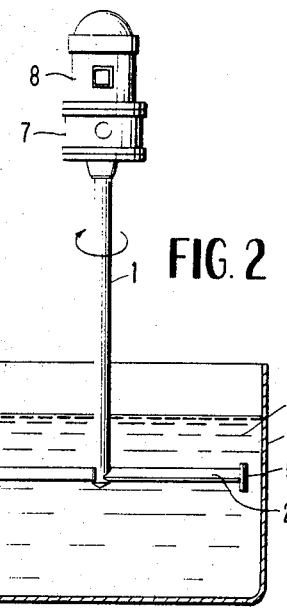
FIG. 2 is a vertical cross sectional view of an embodiment of the cutting apparatus in accordance with the present invention.
Figure 4:
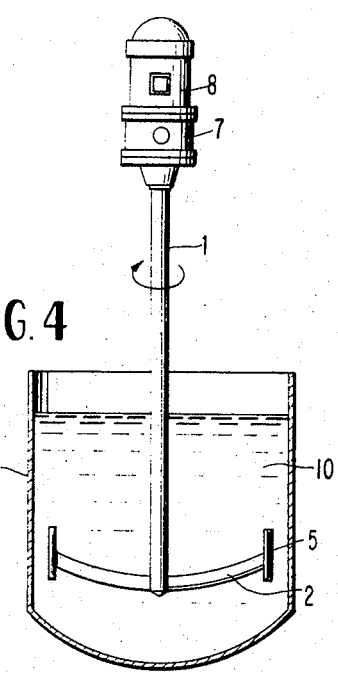
FIGS. 4 and 5 are vertical cross sectional views showing other embodiments of the cutting apparatus in accordance with the present invention.
Figure 5:
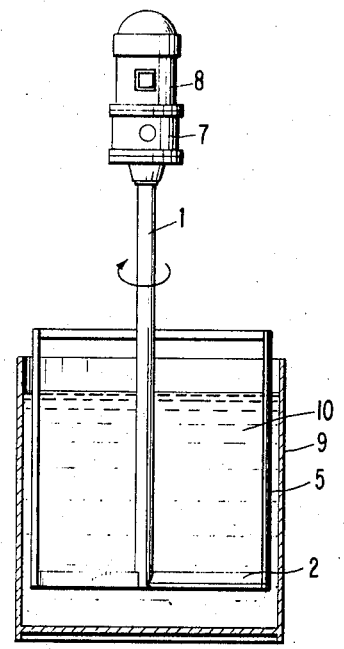
Figure 6:
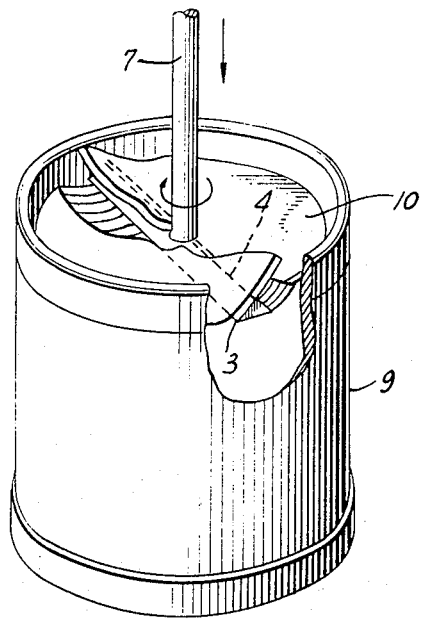
FIGS. 6 and 7 are perspective views of the cutting apparatus of the present invention during operation.
Figure 7:
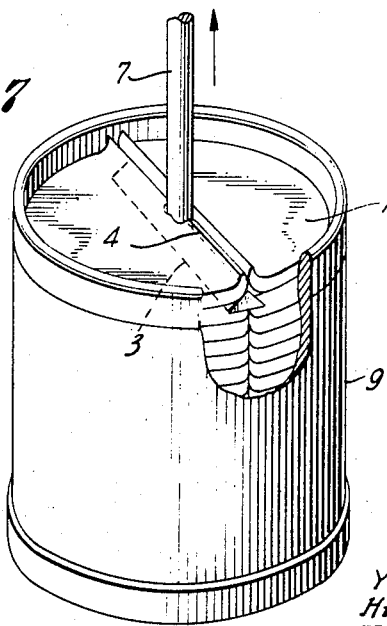

Referring to FIGS. 2, 4 and 5 respectively showing an embodiment of the cutting apparatus in accordance with the present invention, a shaft 1 connected to a motor 8 through a reduction gear 7 is rotated at desired revolutions per minute. At the end of the shaft 1, is fixed an arm 2 having a triangular cross section which rotates with the shaft 1. Moreover, a knife 5 having a sharp edge is fixed at the end of the arm 2. When a rotating shaft 1 is put into the gel material 10 in the tank 9, the gel material 10 is cut spirally by the horizontal edge 3 of the arm 2, and at the same time the gel material 10 adjacent to the cylindrical inner wall of the tank 9 is cut by the sharp edge 6 of the knife 5 along the inner wall. If the clearance between the knife 5 and the wall of the tank 9 in this case is 5 to 20 mm., the gel material 10 fixed to the wall surface is easily removed therefrom.

To let the rotating shaft 1 guide into the gel material 10 in the tank 9, the tank 9 may be raised and/or the shaft 1 may be lowered. When the shaft 1 is lowered to the bottom of the tank 9, the revolution of the shaft 1 is stopped and the tank 9 is moved down and/or the shaft 1 is raised whereby the gel material 10 is cut in the vertical direction by the edge 4 of the arm 2 facing upward.

Figure 3:
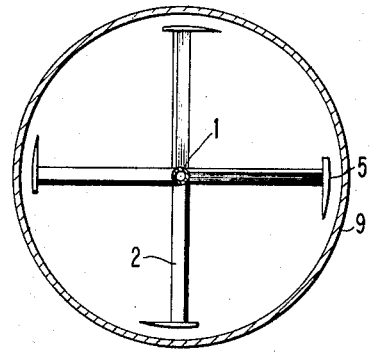
FIG. 3 is a cross sectional view of the embodiment of the present invention.

In this case, the greater the number of the arms 2 which are mounted on shaft 1, the more finely the gel material 10 is cut and divided in the vertical direction. For example, if four arms 2 are used as shown in FIG. 3, the gel material 10 is divided in four parts. It should be noted that the arms 2 are not necessarily symmetrical in respect to the shaft 1. As described above, at least two cutting edges are necessary on arms 2, one of which faces upward and the other faces in the rotating direction of the shaft. As a result the cross section of the arm 2 having the requisite number of edges may be in the shape of an equilateral or scalene triangle. It is not necessary that edges 3, 4 are not exactly perpendicular or parallel respectively to the shaft 1. The shape of the knife 5 may be any form that has a sharp edge facing in the rotating direction of the shaft 1. The distance which the shaft 1 moves down axially while making one complete revolution determines the thickness of the gel material 10 after cutting. The length $l$ of the sharp edge of the knife 5 is changeable according to the property of the gel material, but it is usually made approximately equal to the thickness of the gel material after cutting.

When the shape of the bottom of the tank 9 is not planar, the shape of the arm 2 may be changed to correspond in shape to the curve of the bottom of the tank 9, as shown in FIG. 4.

FIG. 5 represents another embodiment of the present invention which includes a knife 5 having an edge extending parallel to the rotating shaft 1 and connected to shaft 1 by spaced arms fixed to the upper end and the lower end of the knife 5. The gel material is cut into fragments in the tank by a similar operation as in the embodiment shown in FIG. 2.

As the gel material is mechanically cut in the tank by using the cutting apparatus in accordance with the present invention, the working time is shortened and labor is saved. A particularly large space for operation other than that needed for the tank is not required. Moreover, the gel material is cut into the uniform size desired and easily taken out of the tank, therefore loss of material is reduced, resulting in great industrial saving of time, space, and material.

The following examples were conducted using the various embodiments of the present invention along with different gel materials.

Example 1

Silver bromide photographic light sensitive emulsion in a gel state was cut in a tank by the apparatus shown in FIGS. 1 and 2 under the following conditions: (gelatin concentration 12%).

| | |
|---|---|
| Number of revolutions of the shaft r.p.m. | 52 |
| Moving down velocity of the shaft mm./sec. | 31 |
| Length of the arm mm. | 245 |
| Length of knife mm. | 15 |
| Moving up velocity of the shaft mm./sec. | 83 |

The gel emulsion was then cut into semicircular fragments of about 35 mm. thick, which was easily taken out of the tank.

The photographic property of the cut emulsion was as good as that of the emulsion cut with a knife manually as known in the prior art.

Example 2

Silver iodide photographic light sensitive emulsion in a gel state wherein the gelatin concentration was 14% was cut in a tank by the apparatus shown in FIGS. 1 and 2 under the same condition as that of the above Example 1 except that the length of the knife was 50 mm.

The gel emulsion was cut into semicircular fragments of about 35 mm. thick, and the photographic property thereof was as good as that of the cut gel emulsion by manual cut with a knife as shown in the prior art.

EXAMPLE 3

Gel material containing 20% of gelatin was cut by the apparatus shown in FIG. 5 under the following conditions:

| | |
|---|---|
| Number of revolutions of the shaft r.p.m. | 10 |
| Moving down speed of the shaft mm./sec. | 1 |
| Moving up speed of the shaft mm./sec. | 3.8 |
| Length of the arm mm. | 230 |

The gel material was then cut into semicircular fragments of about 6 mm. thick, which were easily taken out of the tank.

The invention has been described in detail with particular reference to some embodiments thereof, but it will be understood that variations and modifications can be effected within the spirit and scope of the invention as described hereinabove and as defined in the appended claims.

What is claimed is:

1. A cutting apparatus of the type used to cut material contained in a tank-like container, the cutting apparatus comprising: a longitudinally movable shaft, means to rotate the shaft simultaneously while moving in a direction longitudinally to said shaft, at least one arm fixed to the rotatable shaft, individual cutting edges arranged on each of the arms, a first one of the cutting edges facing in a direction substantially longitudinal to said shaft and away from the tank bottom, a second of the cutting edges facing in the direction of rotation of the shaft, a knife member fixed to each of the arms and having a cutting edge facing in the direction of rotation of said shaft.

2. A cutting apparatus as in claim 1 wherein a plurality of arms are fixed to the rotatable shaft.

3. A cutting apparatus as in claim 1 of the type used to cut material in a tank wherein the knife member is fixed to the outer extremity of the arm in close proximity to an inner side wall of the tank.

4. A cutting apparatus as in claim 1 of the type used to cut material in a tank wherein the shape of the arm corresponds to the contour of the tank bottom.

5. A cutting apparatus as in claim 1 further comprising at least one pair of arms fixed to the shaft; the arms comprising said pair being longitudinally spaced from one another along the shaft, the knife member mounted on the arms and extending substantially parallel to the shaft.

6. A cutting apparatus as in claim 5 of the type used to cut material within a tank wherein the knife is mounted at the outer extremities of the arms in close proximity to an inner side wall of the tank.

References Cited

UNITED STATES PATENTS

| | | |
|---|---|---|
| 820,530 | 5/1906 | Sturm. |
| 1,689,277 | 10/1928 | Burns. |
| 2,322,146 | 6/1943 | Kuhn. |
| 3,188,677 | 6/1965 | Jamison. |

FOREIGN PATENTS

| | | |
|---|---|---|
| 170,182 | 1/1952 | Austria. |

WILLIAM J. STEPHENSON, Primary Examiner

U.S. Cl. X.R.

15—104.1; 18—22; 83—596